US006680008B1

(12) United States Patent
Baret

(10) Patent No.: US 6,680,008 B1
(45) Date of Patent: Jan. 20, 2004

(54) COMPOUND FOR PRODUCING ELECTRODES AND PROCESS FOR FORMING ELECTRODES

(75) Inventor: Guy Baret, Grenoble (FR)

(73) Assignee: Thomson Plasma, Boulogne Cedex (FR)

( * ) Notice: Subject to any disclaimer, the term of this patent is extended or adjusted under 35 U.S.C. 154(b) by 0 days.

(21) Appl. No.: 09/573,649

(22) Filed: May 18, 2000

(30) Foreign Application Priority Data

May 21, 1999 (FR) ........................................... 99 06458

(51) Int. Cl.[7] .............................. H01B 1/22; B32B 9/04

(52) U.S. Cl. ....................... 252/512; 252/513; 252/514; 174/257; 428/432; 428/434

(58) Field of Search ................................ 252/512, 513, 252/514; 174/257; 428/432, 434; 257/772

(56) References Cited

U.S. PATENT DOCUMENTS

| | | | | | |
|---|---|---|---|---|---|
| 4,625,261 | A | * | 11/1986 | Weeks et al. | 361/516 |
| 5,209,688 | A | | 5/1993 | Nishigaki et al. | 445/24 |
| 5,376,403 | A | * | 12/1994 | Capote et al. | 427/96 |
| 5,948,320 | A | * | 9/1999 | Nikaidoh et al. | 252/512 |
| 6,030,707 | A | * | 2/2000 | Katoh et al. | 428/427 |
| 6,337,522 | B1 | * | 1/2002 | Kang et al. | 257/784 |

FOREIGN PATENT DOCUMENTS

| | | | | |
|---|---|---|---|---|
| EP | 0836892 A2 | | 4/1998 | B05D/1/28 |
| EP | 836892 | * | 4/1998 | B05D/1/28 |
| JP | 07014428 | * | 1/1995 | H01B/1/22 |
| JP | 08130149 | * | 5/1996 | H01G/4/12 |
| JP | 08162003 | | 6/1996 | H01J/1/30 |
| JP | 10106349 | * | 4/1998 | H01B/1/16 |

OTHER PUBLICATIONS

French Search Report dated: Feb. 25, 2000.

*** Patent Abstracts of Japan, vol. 1996, No. 10, Oct. 31, 1996.

* cited by examiner

*Primary Examiner*—Yogendra N. Gupta
*Assistant Examiner*—Kallambella Vijayakumar
(74) *Attorney, Agent, or Firm*—Joseph S. Tripoli; Joseph J. Laks; Carlos M. Herrera

(57) ABSTRACT

The invention provides a novel compound of materials, which solves the problem of metal diffusion into glass layers during the formation of electrodes on a glass substrate. The invention provides a compound which comprises a powder of a conducting metal or alloy and a powder of a meltable metal or alloy. The use of a metal compound furthermore makes it possible to eliminate a firing step in the electrode formation process. Depending on various embodiments, the compound may furthermore include an adhesion promoter, in order to bond the electrodes to the substrate, a resin and/or a photosensitive substance. The invention also relates to a process for manufacturing a plasma panel using the said compound, and to a plasma panel obtained by the said process.

19 Claims, 2 Drawing Sheets

COMPOUND FOR PRODUCING ELECTRODES AND PROCESS FOR FORMING ELECTRODES

FIELD OF THE INVENTION

The invention relates to a compound for poducing lectrodes and to a process for forming electrodes. More particularly, the invention relates to silver pastes or powders for the formation of electrodes on substrates made of glass, especially glass of the soda-lime type, such as those used for plasma display panels.

DESCRIPTION OF THE RELATED ART

In order to define the problem better, the present description relates to the production of plasma display panels. Of course, the invention is not limited to processes for producing plasma display panels but applies to any type of process using materials of the same kind under similar conditions.

As known from the prior art, plasma display panels (hereafter called PDPs) are display screens of the flat type. There are several types of PDP, which all operate on the principle of an electrical discharge in a gas accompanied by the emission of light. In general, PDPs consist of two insulating tiles made of glass, conventionally of the soda-lime type, each supporting at least one array of conducting electrodes and defining between them a space filled with gas. The tiles are joined together so that the electrode arrays are orthogonal. Each electrode intersection defines an elementary light cell to which a gas space corresponds.

The electrodes of PDPs have the feature of being small in cross section (of the order of a few hundred $\mu m^2$), in order not to impede the viewing, and of being very long (of the order of one meter). The electrodes must be made from a material that is a good conductor, allowing electrodes to be produced with a resistance of less than 100 ohms. In addition, the material used must be able to allow lower-cost mass production. At the present time, two techniques are known for producing these electrodes.

The first technique is thin-film metal deposition, which may be carried out by sputtering or by vacuum evaporation. The metal layer generally consists of a copper or aluminium layer placed between two chromium layers, the metal deposition taking place over the entire surface of the tile. A photosensitive resin is then deposited, the resin being exposed through a mask. Next, the resin is developed, thus creating a mask on the metal layer. The metal layer is then etched by acid etching. Finally, the excess resin mask is removed. One advantage of this technique is that it is carried out cold. However, this technique has a number of drawbacks. This is because the process requires many manufacturing steps and metal deposition is fairly expensive. In general, the layers deposited by this technique have thicknesses of about 2 to 3 $\mu$m. A variant of this technique consists in depositing successive layers in order to reduce the overall cost, but this creates uniformity defects on the electrodes.

A second technique is the deposition of a photosensitive silver paste. For this, a silver paste is used which consists of 50 to 70% of silver particles (or particles of another highly conducting metal), having a mean diameter of the order of 1 $\mu$m, the particles being mixed with a powder of a glassy material (for example, a borosilicate) and bonded together by a photosensitive resin. The silver paste is deposited on the tile and then exposed using a mask.

The exposed paste is developed in water, and then the assembly is fired between 450° C. and 580° C. so as to vitrify the glassy material and remove the excess resin. Using the paste makes it possible to have electrodes which are relatively thick (conventionally, of the order of 10 $\mu$m in thickness) with a reduced number of manufacturing steps. Moreover, one variant consists in depositing the silver paste directly by screen printing. Direct screen printing consists in depositing the paste through a mask, thereby eliminating the exposure step and saving on base material, but it remains limited in resolution to dimensions of the order of 100 $\mu$m.

The use of silver paste for the PDP tiles is preferable to the use of thin-film deposition, firstly for cost reasons and secondly for electroconductivity reasons. However, in this specific application a problem arises, as illustrated in FIGS. 1 to 5. A layer 1 of silver paste is deposited on the substrate 2, exposed and then developed so as only to leave the paste forming the electrodes 3. During firing of the electrodes 3, diffusion 4 of silver atoms and/or ions into the substrate 2 occurs. After the firing, the substrate 2 has a yellow-coloured diffused region 5 below each electrode. An insulating layer 6 is then deposited, by depositing a powder or a paste of an enamel, for example an enamel based on lead borosilicate or bismuth borosilicate, which covers the electrodes 3 and substrate 2. The insulating layer 6 is then fired between 550 and 590° C. However, during firing of the layer 6, there is significant diffusion, represented by the arrows 7, of silver into the insulating layer 6 which is in a fluid state during the firing. At the end of firing, electrodes 3 of slightly reduced cross section and surrounded by a diffusion region 8 are obtained. The diffusion region 8 is not conducting. The main drawback with this diffusion region 8 is its yellow colour which is to the detriment of the transparency of the tile which supports the electrode array(s), something which is particularly problematic when the tile is the front tile through which light has to pass.

SUMMARY OF THE INVENTION

The main object of the invention is to improve the screen-printing process of the prior art by reducing the firing temperature and/or by simultaneously firing the electrodes and the insulating layer, while reducing the yellowing of the substrate and of the insulating layer. The invention provides a novel compound of materials which solves this problem. The invention proposes to partly or completely replace the powder of glassy material with a metal powder whose melting point is below the firing temperatures used in the manufacture of a plasma display panel. The use of a meltable metal powder allows the conductivity of the electrodes to be increased while increasing the cohesion of the silver particles. Furthermore, the use of a meltable metal as binder after melting makes it possible to use resins which are not compatible with borosilicates, thereby reducing the diffusion of silver into the insulating layer.

The subject of the invention is a compound of materials for forming electrodes on a glass substrate, the compound comprising a powder of a conducting metal or alloy and a powder of a meltable metal or alloy.

Preferably, the melting point of the meltable metal or alloy is less than 580° C.

According to various embodiments, the compound may furthermore include an adhesion promoter, for bonding the electrodes to the substrate, a resin and/or a photosensitive substance.

Preferably, the compound is a paste in which 50 to 87% of its mass consists of conducting metal, 3 to 30% of its mass consists of meltable metal, 2 to 20% of its mass consists of adhesion promoter and 8 to 35% of its mass consists of resin.

The invention also relates to a process for manufacturing a plasma display panel, wherein the compound of the invention is deposited in a pattern on a glass substrate, an insulating layer of a glass in the form of a powder or a paste is deposited and the whole assembly is heated to a temperature of less than or equal to 580° C. The insulating layer is deposited as soon as the compound has been deposited in a pattern, without firing the electrodes beforehand.

The subject of the invention is also a plasma panel whose tiles are obtained by the process of the invention.

The invention will be more clearly understood and further features and advantages will appear on reading the description which follows, the description referring to the appended drawings in which:

DETAILED DESCRIPTION OF THE PREFERRED EMBODIMENTS

The borosilicate powder in a compound intended for the production of electrodes on a glass substrate fulfils two functions. A first function is to provide cohesion of the particles of conducting metal. A second function is to provide adhesive bonding of the electrodes to the substrate.

According to a first embodiment, a paste is produced which comprises, in proportion by mass, 60 to 89% of a powder of a conducting metal, 3 to 30% of a powder of a meltable metal and 8 to 35% of a resin. By way of example, a paste containing 64% conducting metal, 18% meltable metal and 18% resin may be used. The conducting metal must be a metal with a high conductivity, preferably silver, which can be reduced to a fine powder (the mean particle diameter of which is, for example, between 0.1 and 5 μm) and which is compatible with the rest of the manufacturing process. The meltable metal is a metal with a low melting point, which must melt at a temperature below the firing temperatures used in a process for producing plasma panel tiles. Since at the present time the firing temperatures are less than 580° C., it is sufficient for the meltable metal to melt below 580° C. Lead or bismuth or tin or indium or zinc, or an alloy containing one or more of these metals, the melting point of which allows use in a process for manufacturing plasma display panels, may be used indiscriminately. The resin serves as a binder before firing; preferably, an aqueous resin which completely decomposes during firing is used.

Figure 1:
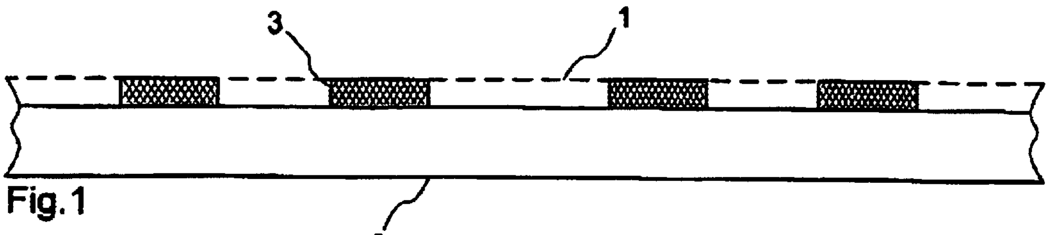
FIGS. 1 to 5 illustrate a process for manufacturing electrodes on a glass substrate, according to the prior art.
Figure 2:
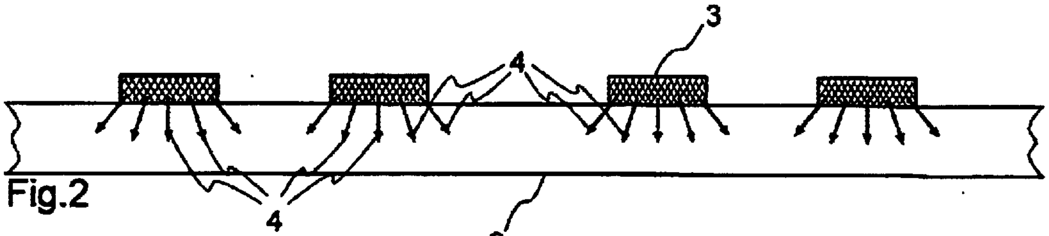
Figure 3:
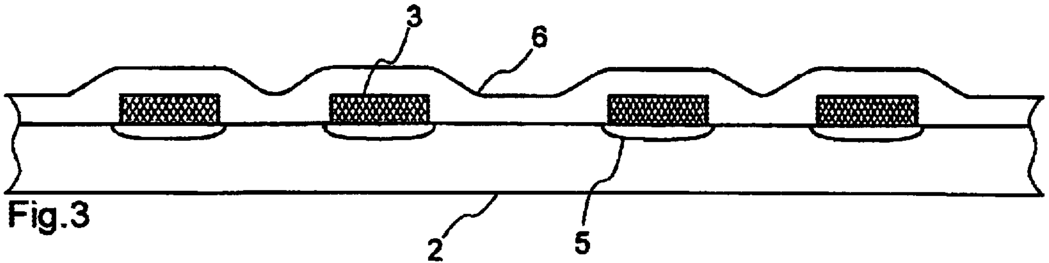
Figure 4:
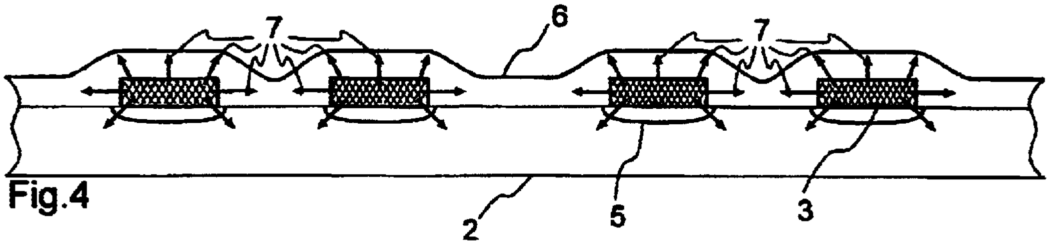
Figure 5:
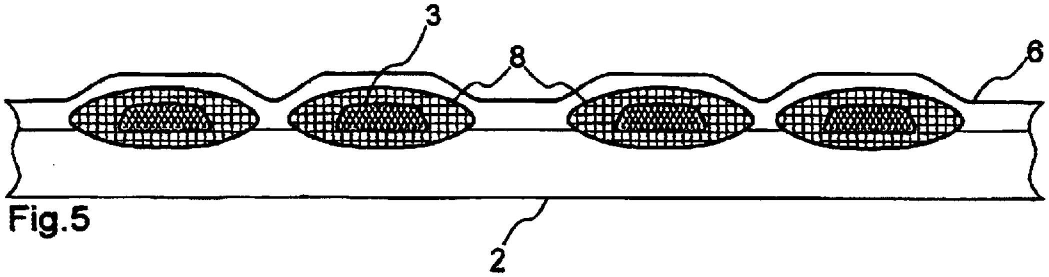
Figure 6:
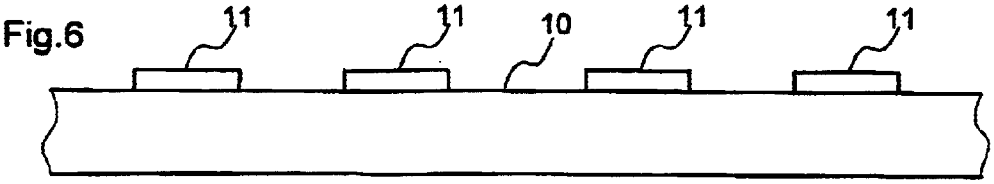
FIGS. 6 to 11 illustrate processes for manufacturing electrodes on a glass substrate, according to the invention.
Figure 7:
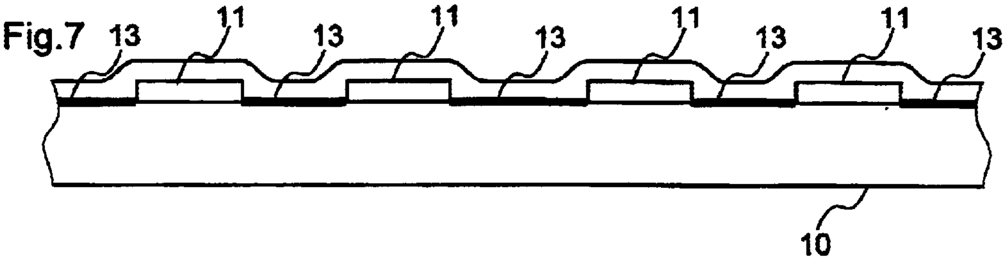
Figure 8:
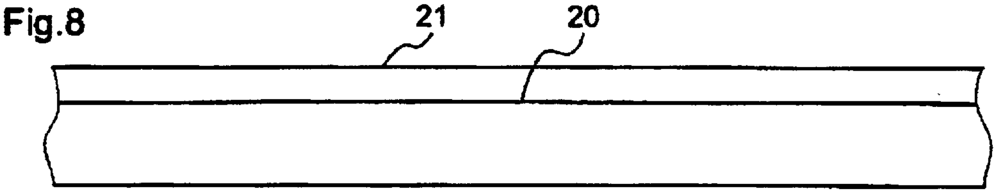
Figure 9:
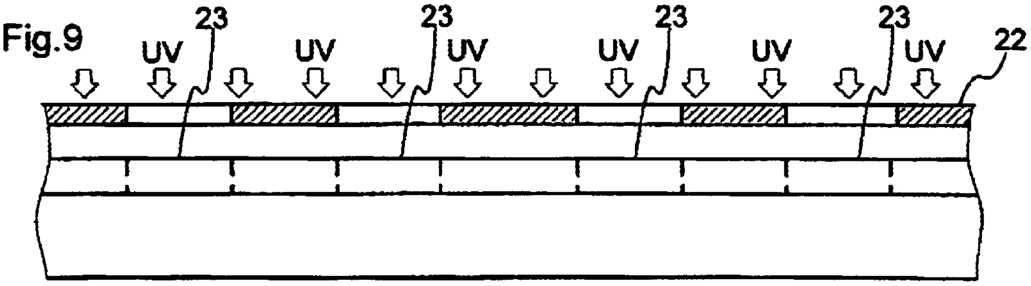
Figure 10:
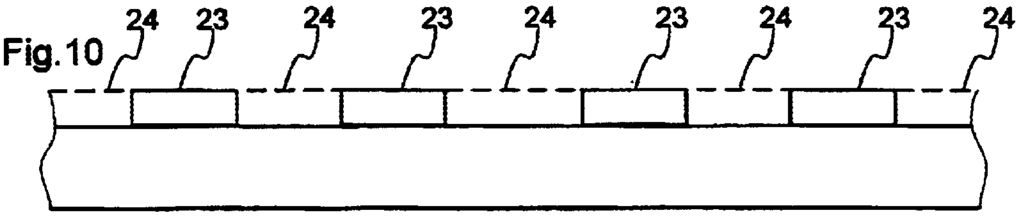
Figure 11:
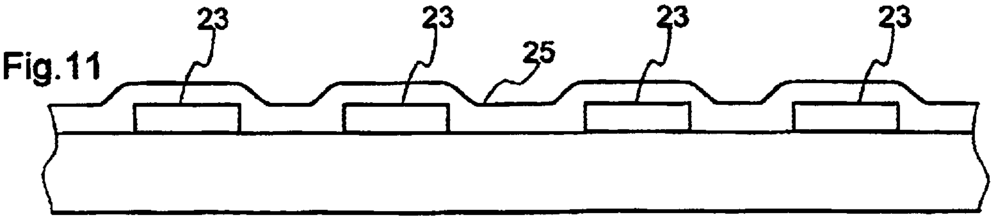

The application of the paste described above is carried out by direct screen printing with cofiring of the electrodes and the insulating layer. This is because once the meltable metal has melted and the resin has disappeared, the electrodes become compact but do not adhere by themselves to the glass substrate. It is necessary to deposit, using a deposition mask, the paste on a substrate 10 at places where the electrodes 11 have to be, as illustrated in FIG. 6. A layer 12 of a powder or paste of a borosilicate is then deposited on top of the electrodes, as indicated in FIG. 7. Next, the whole assembly is fired, for example at 580° C., which liquefies the meltable metal on the one hand and borosilicate on the other. After cooling, the electrodes 11 are held in place on the substrate 10 by the insulating layer 12 which is adhesively bonded to the substrate 10 between the electrodes by bonding regions 13. The electrodes, consisting only of a compound of two metals, also have a higher conductivity than the electrodes produced according to the prior art. However, since the electrodes are not fastened to the substrate, they are weak until they have been covered with the insulating layer 12, something which is the case in particular at the points of contact between the electrodes and the drive circuits of a plasma display panel.

According to a second embodiment, a paste is produced which contains, in proportions by mass, 50 to 87% of a powder of a conducting metal, 3 to 30% of a powder of a meltable metal, 8 to 35% of a resin and 4 to 20% of an adhesion promoter. The adhesion promoter serves to bond the electrode to the glass substrate. It is also possible to use a borosilicate, but its use is not compatible with certain aqueous resins. It has in fact been noticed that the use of aqueous resins such as polyvinyl alcohols dissolved in water reduces the diffusion of silver into the borosilicate. Moreover, polyvinyl alcohols also have the advantage of being inexpensive and of completely degrading during firing. It is therefore preferred to use other adhesion promoters, such as alkali metal silicates or bismuth oxides, which bring about bonding to the substrate while being compatible with polyvinyl alcohols, thus reducing the diffusion of silver into the insulating layer.

By way of example, the conducting paste may consist, in proportions by mass, of 15% of an aqueous solution of polyvinyl alcohol whose viscosity is 2500 centipoise (cps or millipascals/second), of 70% of silver whose mean particle diameter is approximately 1.5 μm, of 10% of zinc whose mean particle size is approximately 3 μm and 5% of lithium silicate. After the layer of conducting paste has been deposited through a screen-printing mask, the paste is dried at 70° C. Next, a layer of a glassy insulation, either in powder form or in paste form, is then deposited and the whole assembly is fired, for example at 580° C. During the firing, the resin is burnt off almost entirely so that the electrodes consist only of conducting metal, of meltable metal and of adhesion promoter.

It is also possible to include a photosensitive substance in the resin, so as to obtain a photosensitive paste. The photosensitive substance may, for example, be potassium, sodium or ammonium dichromate, or a diazo compound or any other substance making the resin used sensitive to light (visible or UV). The photosensitive substance is mixed with the resin in proportions of 0.1 to 1%. For example, a polyvinyl alcohol containing 0.3% by mass of potassium dichromate will be used in the above paste example.

Electrode production then takes place as indicated in FIGS. 8 to 11. A layer of photosensitive paste 21 is deposited on a substrate 20. With the aid of a mask 22, the electrodes 23 are exposed to UV radiation, the wavelength of which is between 365 and 420 nm. After exposure, the unexposed parts 24 of the paste are removed by a water spray. A layer 25 of glassy material is then deposited and the whole assembly is fired, for example at 580° C.

According to another embodiment, a paste is produced whose proportions by mass are 17% of polyvinyl alcohol mixed with 0.3% of ammonium dichromate, 60% of silver whose mean particle size is 3 $\mu$m, 15% of a tin-lead alloy whose mean particle size is 9 $\mu$m and 8% of sodium silicate. This paste may be used in the same way as described above.

It is also possible to fire the electrodes and the insulating layer separately. By way of example, if it is desired to fire only the electrodes produced with the paste described above, the firing may be carried out only at 400° C.

Very many variants are possible by replacing some of the substances in the compound with other equivalent substances. The conducting metal used in the embodiments is silver, but it would also be possible to use gold or any other metal or metal alloy having a high conductivity and being highly oxidation-resistant.

For cost reasons, essentially silver or a silver alloy is used. However, it is necessary to avoid compounding metals which carry the risk of reacting with another substance. Likewise, it is possible to use resins other than polyvinyl alcohol. However, it is preferred to use a polyvinyl alcohol for reasons of cost and of ease of use. It is even possible to omit the resin if it is desired to use the compound of the invention in powder form. A drawback with powders is that they are more difficult to use in a pattern than pastes.

I claim:

1. A composition for forming fired electrodes on a glass substrate, the composition comprising:

a powder of a conducting metal or alloy, a powder of a meltable metal or alloy, wherein the meltable metal or alloy is zinc or lead or tin or bismuth, or an alloy comprising two or more of these metals, the melting point of which is less than about 580C and, an aqueous resin.

2. The composition according to claim 1, wherein the composition further includes an adhesion promoter for bonding the electrodes to the substrate.

3. The composition according to claim 1, wherein the aqueous resin is polyvinyl alcohol dissolved in water.

4. The composition according to claim 1, wherein the composition further includes a photosensitive substance.

5. The composition according to claim 4, wherein the photosensitive material is an ammonium or alkali metal dichromate, or diazo compound.

6. The composition according to claim 2, wherein the adhesion promoter is a sodium silicate or a bismuth oxide.

7. The composition according to claim 1, wherein the conducting metal or alloy is silver or a silver alloy.

8. The composition according to claim 2, wherein the composition is a paste in which:

a. 50–87% of its mass consists of conducting metal;

b. 3–30% of its mass consists of meltable metal;

c. 8–35% of its mass consists of an aqueous resin; and d. 2–20% of its mass consists of adhesion promoter.

9. A fired electrode on a glass substrate formed from a composition comprising:

a powder of a conducting metal or alloy;

a powder of a meltable metal or alloy, and, an aqueous resin.

10. The fired electrode of claim 9, wherein the firing was accomplished at a temperature of between about 400C and about 580C.

11. The fired electrode according to claim 9, wherein the melting point of the meltable metal or alloy is less than 580C.

12. The fired electrode according to claim 9, wherein the composition further includes an adhesion promoter for bonding the electrodes to the substrate.

13. The fired electrode according to claim 9, wherein the aqueous resin is polyvinyl alcohol dissolved in water.

14. The fired electrode according to claim 9, wherein the composition further includes a photosensitive substance.

15. The fired electrode according to claim 14, wherein the photosensitive material is an ammonium or alkali metal dichromate, or diazo compound.

16. The fired electrode according to claim 12, wherein the adhesion promoter is a sodium silicate or a bismuth oxide.

17. The fired electrode according to claim 9, wherein the conducting metal or alloy is silver or a silver alloy.

18. The fired electrode according to claim 9, wherein the meltable metal or alloy is zinc, or lead, or tin, or bismuth or an alloy comprising two or more of these metals, the melting point of which is less than about 580C.

19. The fired electrode according to claim 14, wherein the composition is a paste in which:

50–87% of its mass consists of conducting metal;

3–30% of its mass consists of meltable metal;

8–35% of its mass consists of an aqueous resin; and

2–20% of its mass consists of adhesion promoter.

* * * * *